(12) United States Patent
Melen et al.

(10) Patent No.: US 6,970,847 B1
(45) Date of Patent: Nov. 29, 2005

(54) BUSINESS METHOD FOR SECURE DOCUMENT FOLDER DISTRIBUTION

(75) Inventors: Roger D. Melen, Los Altos Hills, CA (US); Boris Krtolica, Saratoga, CA (US); Neil Williams, Los Gatos, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 219 days.

(21) Appl. No.: 09/695,747

(22) Filed: Oct. 24, 2000

(51) Int. Cl.$^7$ ............................................. G06F 17/60
(52) U.S. Cl. ................................ 705/51; 725/1; 725/86
(58) Field of Search ........................ 705/50–53, 55–56, 705/74–77; 713/151–154; 380/210–211, 380/28–30; 725/1–14, 62–63, 74, 86–105

(56) References Cited

U.S. PATENT DOCUMENTS

| | | | |
|---|---|---|---|
| 5,619,649 A * | 4/1997 | Kovnat et al. ......... | 395/200.01 |
| 5,862,223 A * | 1/1999 | Walker et al. ................ | 380/25 |
| 5,940,504 A * | 8/1999 | Griswold ....................... | 380/4 |
| 6,128,644 A * | 10/2000 | Nozaki ....................... | 709/203 |
| 6,151,696 A * | 11/2000 | Miller et al. ................ | 714/748 |
| 6,167,409 A * | 12/2000 | DeRose et al. ............. | 707/513 |
| 6,233,252 B1 * | 5/2001 | Barker et al. ............... | 370/473 |
| 6,317,775 B1 * | 11/2001 | Coile et al. ................. | 709/201 |

FOREIGN PATENT DOCUMENTS

| | | | | |
|---|---|---|---|---|
| EP | 0 770 965 A1 * | 5/1997 | ........... | G06F 17/30 |

OTHER PUBLICATIONS

Bagley et al., "Editing Images of Text", Communication of the ACM, v37n12, pp 63-72, Dec. 1994, ISSN: 0001-0782.*

* cited by examiner

*Primary Examiner*—Mary Cheung
(74) *Attorney, Agent, or Firm*—Fitzpatrick, Cella, Harper & Scinto

(57) ABSTRACT

A system, method, and computer readable medium for a business to securely distribute potentially large collections of document folders (180) to recipients (140). The system comprises a sending device (160) for sending the document folders (180) and temporarily storing the document folders (180) on a network (120) of interconnected computers (170), a destination computer (170) for accumulating the sent document folders (180) destined for a particular recipient (140), and a receiving device (130) for receiving the accumulated document folders (180) from the destination device (170). The method comprises the steps of sending the document folders (180) to a network (120) of interconnected computers (170); notifying each recipient (140) of an electronic document folder (180) by means of an indirect reference to the electronic document folder (180); selecting a destination location (170) for the electronic document folder (180) using data supplied by the recipient (140); and accumulating the electronic document folders (180) at the destination location (170).

38 Claims, 10 Drawing Sheets

| SENDER'S NAME | RECIPIENT'S NAME | DOCUMENT 178 RECEPTION ADDRESS DATA | RECEIVING DEVICE 130 CAPABILITIES | DOCUMENT 178 RECEPTION LOCATION DATA |
|---|---|---|---|---|
| SMITH | WARREN | FTP:/ AVISTADEL. COM/ DOC/PRINT/ TTY.PRN | COLOR, 300 DPI, PDF | 73 DX STREET, BESTTOWN, CA 59959<br><br>333.444 555.66 |
| . . | . . . | . . . | . . | . . . . |

BUSINESS METHOD FOR SECURE DOCUMENT FOLDER DISTRIBUTION

BACKGROUND OF THE INVENTION

1. Field of the Invention

This invention relates generally to distribution of collections of large documents in electronic form, and more particularly, to a business method for secure document folder distribution.

2. Description of Background Art

The expanded popularity of the Internet has brought new problems to Internet users. As users conduct more business over the Internet, they need to send collections of large documents. Electronic mail has become a popular and widespread means for communicating electronically via interlinked computers. Files, including electronic image files, may be attached to electronic mail messages. Small documents may be sent easily through the Internet as file attachments. Larger documents and collections of larger documents of more than 5 MB, however, are more difficult to send reliably through the Internet without losing the benefit of security.

Furthermore, sending collections of large documents of more than 5 MB over the Internet is very time-consuming and takes up a lot of network resources. For example, if a sender wants to transmit the same document to ten recipients, he needs to attach ten electronic image files to electronic mail messages, thereby significantly increasing the delivery time.

What is needed, therefore, is a method and system that allows a sender to send collections of large documents to possibly multiple recipients in a short period of time.

DISCLOSURE OF INVENTION

The present invention is a system, method, and computer readable medium for a business to securely distribute document folders (180) to recipients (140). The system comprises a sending device (160) for sending the document folders (180) and temporarily storing the document folders (180) on a network (120) of interconnected computers (170), a destination computer (170) for accumulating the sent document folders (180) stored on the network (120), and a receiving device (130) for receiving the sent document folders (180) from the destination computer (170).

The method comprises the steps of sending the document folders (180) to a network (120) of interconnected computers (170); notifying each recipient (140) of the sent document folders by means of an indirect reference to the electronic document folders (180); selecting a destination location (170) for the electronic document folders using data supplied by each recipient (140); and accumulating the electronic document folders (180) at the destination location (170).

An advantage of the present invention is that it allows distributing collections of large documents of more than 5 MB to multiple recipients (140) in a short period of time without overly consuming network (120) resources.

BRIEF DESCRIPTION OF THE DRAWINGS

The above and other more detailed and specific objects and features of the present invention are more fully disclosed in the following specification, reference being had to the accompanying drawings, in which:

FIG. 2A illustrates an example of a database record 222 provided by a recipient 140 to retrieve an electronic document folder 180.

DETAILED DESCRIPTION OF THE PREFERRED EMBODIMENTS

The present invention is a system, method, and computer readable medium for a business to securely distribute document folders 180 to recipients 140.

Figure 1:
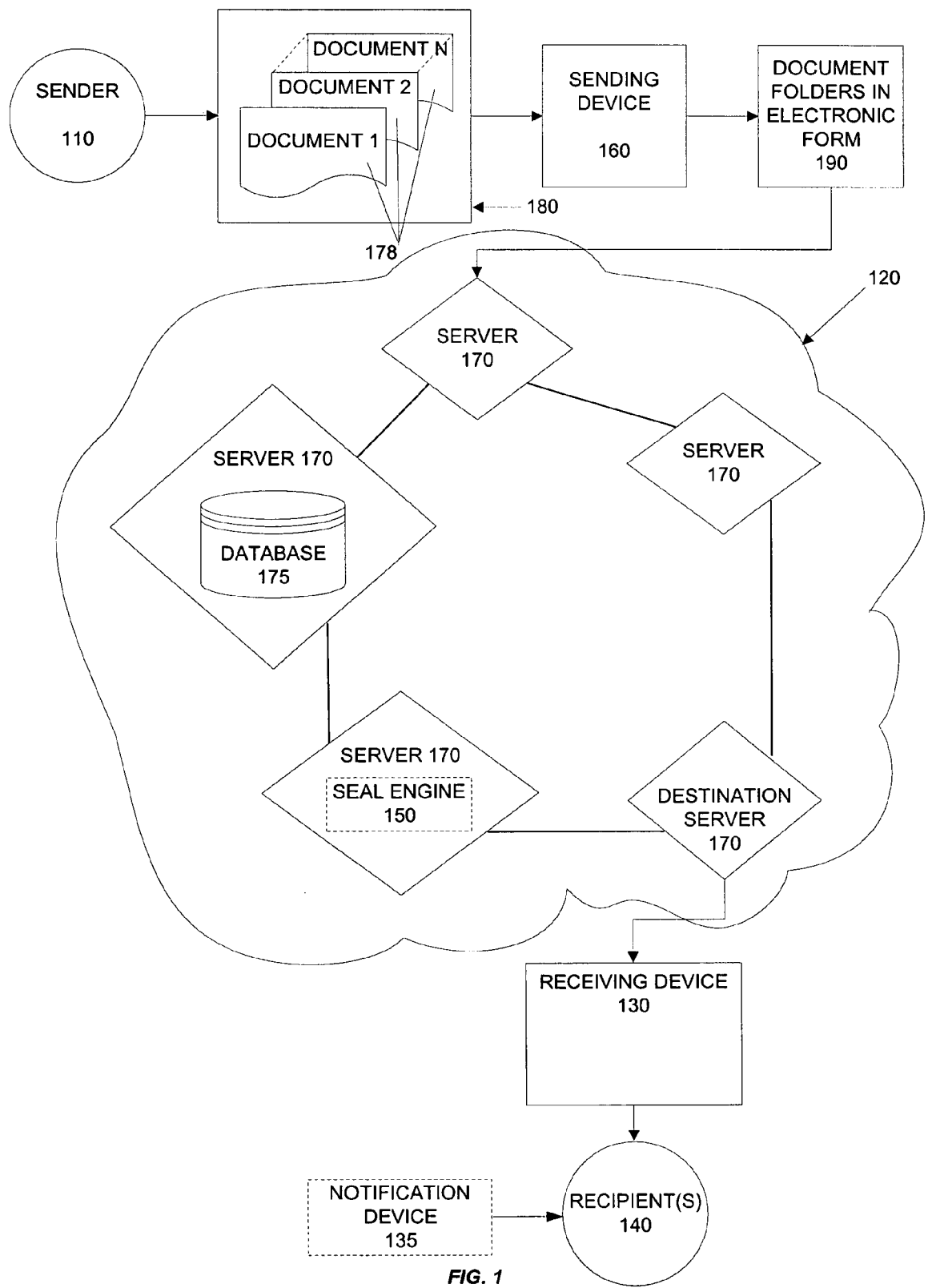
FIG. 1 is a block diagram of a preferred embodiment of the present invention.

The configuration depicted in FIG. 1 includes at least one, and preferably a plurality of, senders 110; at least one document folder 180 that sender 110 wants to send to at least one recipient 140; a sending device 160; document folders in electronic form 190; a network 120 of interconnected computers 170; at least one destination computer 170; at least one receiving device 130 associated with each destination computer 170; an optional notification device 135; one or more recipients 140; and an optional seal engine 150. More than one recipient 140 can be associated with each receiving device 130. Each document folder 180 contains at least one, and typically a plurality of, documents 178.

A sender 110 is a person who wishes to send a document folder 180 to one or more recipients 140. Sender 110 inputs the document folders 180, which may be in paper or electronic form, into a sending device 160. The sending device 160 can be a scanner, a Web-enabled personal computer, a facsimile machine, or any other device which can process documents 178 and output them in electronic form 190. The electronic document folders 190 are sent to the network 120, where they are temporarily stored.

The purpose of the network 120 is to distribute and process the documents 178. Sending the document folders 180 to network 120 avoids a single point of failure. In the event any particular computer 170 in the network 120 fails, the continuous operation of the overall network 120 is not compromised; the network 120 is tolerant to software and hardware problems or faults. Each interconnected computer 170 in the network 120 is typically a server computer, including a processor and a memory. The memory includes instructions capable of being executed by the processor to perform the functions described below. Each server 170 can also include a computer readable medium for storing these instructions.

One server 170, e.g., the server 170 shown on FIG. 1 as containing database 175, may be entrusted with certain supervisory functions. This computer 170 notifies recipients 140 of document folder 180 delivery. This server 170 optionally records an acknowledgment of document folder 180 delivery and makes said acknowledgment available to sender 110. One or more servers 170 may also process sent document folders 180 to convert them into a different format or formats (such as a page description language) to assure they work optimally with each receiving device 130; perform an optional authentication process; and/or perform administrative and billing functions.

One or more computers 170 accumulate sent document folders 180 for delivery to recipients 140. These computers 170 are known as destination computers 170 or destination locations 170. More than one recipient 140 can select the same destination computer 170. Conversely, each recipient may retrieve document folders 180 from more than one destination computer 170. Each destination computer 170, which can be any server 170 in the network 120, is preferably located at a partnership business facility that has agreed to participate in the business of securely distributing document folders 180 to recipients 140. The partnership business facility can be any facility providing printing or photocopying services to clients (e.g., Kinko's).

When a recipient 140 wishes to retrieve electronic document folders 180, the recipient 140 provides to the notifying server 170 information from the indirect reference to the electronic document folders 180 that was contained in the notification to the recipient 140, and possibly other data 222. This data 222 supplied by recipient 140 is recorded in database 175, which is located on at least one of the servers 170.

At least one receiving device 130 is associated with each destination computer 170, preferably co-located at the same partnership business facility. Receiving device 130 can be a Web-enabled personal computer; a Web-enabled printer, such as kiosk printer, connected to network 120; a Web-connected digital copier that has a built-in personal computer with Internet connection; or an Internet appliance, which could be a Web-enabled television.

The system further optionally includes one or more separate notification devices 135 to assist recipient 140 in receiving notifications of sent electronic document folders 180. Alternatively, notification of sent documents 178 can be made through a destination computer 170 and/or a receiving device 130. Notification device 135 can be a Web-enabled personal computer, a Web-enabled Internet appliance, a cellular telephone, or any other device capable of sending messages to recipients 140. Receiving notification via notification device 135 advantageously gives recipients 140 timely knowledge of when a sender 110 has sent document folders 180.

Optional seal engine 150 is co-located with at least one computer 170. Engine 150, which may be embodied in hardware, firmware, and/or software, encodes information and attaches a seal 302 to documents 178 based upon instructions conveyed from senders 110 and/or recipients 140. Seal engine 150 is used for authentication purposes to assure that a document 178 which apparently came from a sender 110 is a document actually sent by the sender 110. The seal 302 is a digital collection of information which may be encoded into the image 190 of the document 178. The information contained in seal 302 provides surety and guards against forgery.

The system is described above in connection with the Internet as network 120. However, a wide variety of networks 120, including local area networks (LANs), wide-area networks (WANs), and intranets can be used instead.

Figure 2:
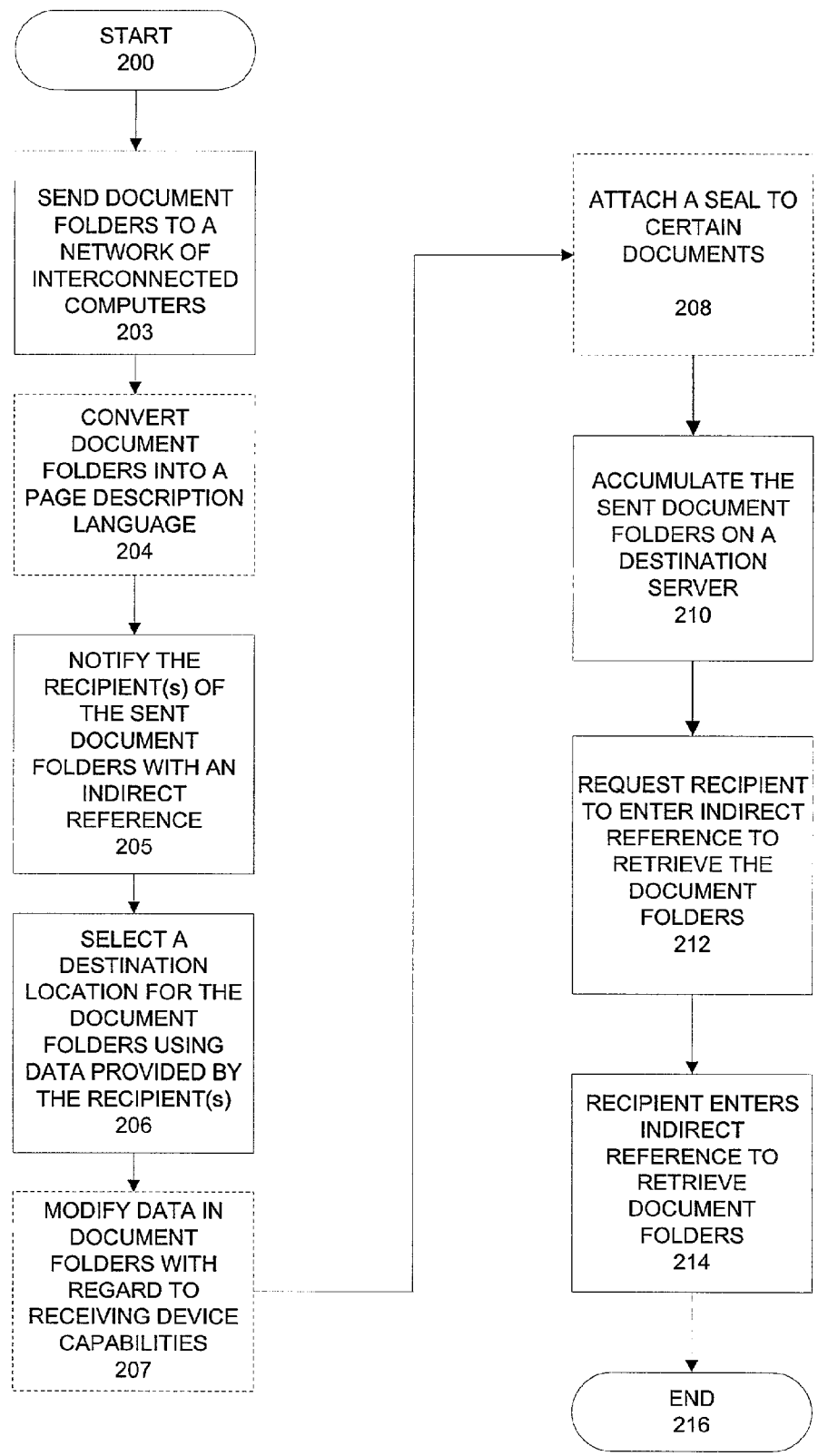
FIG. 2 is flow chart illustrating a preferred embodiment of the present invention.

FIG. 2 illustrates that the method of the present invention starts 200 by a sender 110 sending one or more document folders 180 to the network 120, at step 203. The sender 110 typically forwards the document folders 180 to sending device 160. In one embodiment of the present invention, the sender 110 scans the document folders into a scanner 160 (or the sender instructs the business to scan the document folders into the scanner 160 for him). In an alternative embodiment, the sender 110 forwards the documents 178 to the network 120 from his personal computer 160. Device 160 typically converts the documents 178 into images 190. Information in the document folders 180 is distributed, e.g., by being broken up into packets, into the network 120, where it is temporarily stored.

The clients of the business (anyone from the group of senders 110 and recipients 140) have an option of specifying a date of expiration of the document folders 180 stored on the network 120. Also, the business and one or more clients 110, 140 can mutually agree upon the period of time the document folders 180 can be stored on the network 120 at no cost to the client 110, 140. It should be noted that a given document folder 180 might comprise only one document 178 or a plurality of documents 178. The documents 178 can be in different file formats, such as audio, video, or formats having printable representation. One of the best modes of carrying out the present invention is sending documents 178 having printable representation, so that remote recipients 140 can conveniently print the sent documents 178 at a convenient destination location 170.

The document folders 180 can be sent to the network 120 using virtual private network (VPN) security. A VPN is a network that is constructed using public wires to connect nodes. There are a number of VPN systems that enable one to create networks using the Internet as the medium for transporting data. These systems use encryption and other security mechanisms to ensure that only authorized users can access the network 120 and that the data cannot be intercepted.

Once the document folders 180 have been temporarily stored on the network 120, the documents 178 are typically converted into a page description language or format 190 (in step 204 of FIG. 2) by one of the computers 170. Converting a document 178 into page description format (PDF) does not allow a recipient 140 to change the format and content of the received document 178. This feature provides for portability and commonality of format and can mask some anomalies of technology on the reception end. PDF captures formatting information from a variety of desktop publishing applications, making it possible to send formatted documents and have them appear on the recipient's monitor or printer 130 as the sender 110 intended them. Alternatively, conversion to PDF can be done by sending device 160 prior to transmitting the documents 180 onto the network 120.

In step 205, one of the computers 170 notifies recipient 140 of a sent document folder 180 by means of providing an indirect reference to the document folder 180. An indirect reference to the electronic document folder 180 can be a folder code containing information needed to retrieve the document folder 180. This information can be, for example, a document number.

A folder code may be a privacy code or mediacard data. A privacy code can be automatically sent to recipient 140 via e-mail when the document 178 is available for access from the network 120. This privacy code may be a simple set of numbers and may be viewed on a simple display 130, 135, such as found on many cellular phones. The privacy code, which arrives in an encrypted form, helps to ensure that unauthorized users cannot access the sent document folders 180. To read an encrypted file, recipient 140 must have access to a password that enables recipient 140 to decrypt it. The encryption and decryption can be performed using symmetric key (secret key) or asymmetric key (public key) cryptography.

When public key cryptography is used, two keys are used—a public key known to everyone and a private or secret key known only to the recipient 140 of the message. When a sender 110 wants to send a secure document to a recipient 140, the sender 110 uses the recipient's public key to encrypt the message. Recipient 140 then uses his or her private key to decrypt it. At least one server 170 located on the network 120 has a table of clients' names and their corresponding public keys. When the designated server 170 sends a notification message to a recipient 140, recipient 140 can decrypt the message using his or her private key.

A folder code can also be mediacard data. A mediacard is an electronic device that contains electronic memory. A mediacard preferably should be delivered to a recipient 140 prior to document folder 180 retrieval. Such a mediacard may be created using a networked transmission of mediacard data as part of the mediacard delivery process.

It should be noted that the document folder 180 retrieval need not be based on privacy code or mediacard data. Any data providing an indirect reference to electronic document folders 180 can be used in the delivery process.

The indirect reference notification can arrive at notification device 135 or receiving device 130. The notification can be in the form of e-mail if device 135 is a Web-enabled personal computer, or via voice mail if device 135 is a cellular telephone, or by a combination of e-mail and voice mail. The notification message informs recipient 140 that at least one document folder 180 has been sent to that recipient 140 and is ready for pickup.

Once the notification arrives at device 135, a designated computer 170 selects a destination location or locations 170 for the electronic document folders 180 using data provided by each recipient 140, in step 206. Such data can include document 178 reception address data, and/or additional document 178 reception data.

Document 178 reception address data can be path information and/or method for network document folder 180 delivery. An example of document 178 reception address data is:

ftp:/avistadel.com/doc/print/tty.prn (see FIG. 2A)

Additional document 178 reception data can include document 178 reception location data (data used for improving the document 178 delivery experience through the knowledge of the geographical location of the receiving equipment 130 and the destination location 170 of the receiving equipment 130) and/or receiving device 130 capabilities (screen/printer capabilities of the receiving device 130, such as text/graphics, color or black and white representation).

In step 207, the process proceeds by a designated computer 170 optionally automatically modifying information contained in document folders 180 for best recipient 140 use with regard to receiving device 130 capabilities. For example, if the receiving device 130 is a black and white printer, the business may have decided that it is desirable to modify document 178 data to remove any color information contained in document images 190 for fastest transmission on the network 120. Similarly, if the receiving equipment 130 has text, but not graphic capabilities, the business may have decided that it is desirable to modify the document 178 data so that only text is included.

Recipient 140 or sender 110 may optionally (in step 208) request authentication of documents 178 to assure that recipient 140 takes delivery of an actual document 178 sent by sender 110, and not a forged document. When the authentication process is included, seal 302 is attached to a document 178 by seal engine 150. The seal 302 is a digital collection of information which may be encoded into document image 190.

In step 210, a designated computer 170 causes the sent document folders 180 to accumulate on destination computer 170 using data 222 provided by recipient 140. When recipient 140 requests the designated computer 170 to deliver the sent document folders 180, he or she may select the destination computer 170 to be used.

To retrieve the sent document folders 180, recipient 140 is prompted in step 212 by the designated computer 170 to enter information from the indirect reference notification. For example, this information may be a document number. The business may impose a requirement that recipient 140 provide this information in encrypted form.

In step 214, recipient 140 takes document delivery based on all the information and data 222 submitted, using receiving device 130.

Once recipient 140 takes delivery of document folders 180, the process ends in step 216.

FIG. 2A illustrates an example of typical data 222 provided by recipient 140 to optimize and tailor the retrieval of electronic document folders 180. This data 222 supplied by recipient 140 is sent to database 175, which is located on at least one of the servers 170. An exemplary data record 222 has the following fields: sender's name, recipient's name, document 178 reception address data, and additional document 178 reception data. The latter field is broken into two subfields: receiving device 130 capabilities and document 178 reception location data.

The document 178 reception address data can include path information and/or method for network document folder 180 delivery.

The document 178 reception location 170 data is particularly useful when the document 178 may be sent to several destination servers 170 throughout the world. The document 178 reception location 170 data is used for improving the document 178 delivery experience by using the geographical location of the receiving device 130 and the network 120 location of the receiving device 130. The preferred destination server 170 for document 178 delivery may be determined using this location data.

Recipient 140, using notification device 135 and/or receiving device 130, is prompted in step 212 to provide any document 178 reception address data and any additional document 178 reception data before the destination location 170 is selected for the document folders 180 delivery. This data 222 is recorded in database 175. The exemplary database record 222 shown in FIG. 2A includes a sender's name="SMITH"; a recipient's name="WARREN"; document 178 reception address data= "ftp:/avistadel.com/doc/print/tty.prn; receiving device 130 capabilities="color, 300 dpi, pdf"; document 178 reception location data=73 DX STREET, BESTTOWN, CA 59959, and the Internet address of the nearest server 170 to the receiving location 130: 333.444.555.66. Once recipient 140 provides the above data 222, the designated computer 170 (typically computer 170 co-located with database 175) selects the destination location 170 for the document folder 180 delivery. Some or all of the data 222 can be provided to the designated supervisory computer 170 automatically by receiving device 130.

Alternatively, data 222 can be hand-entered into receiving device 130 or notification device 135, by recipient 140.

Figure 3:
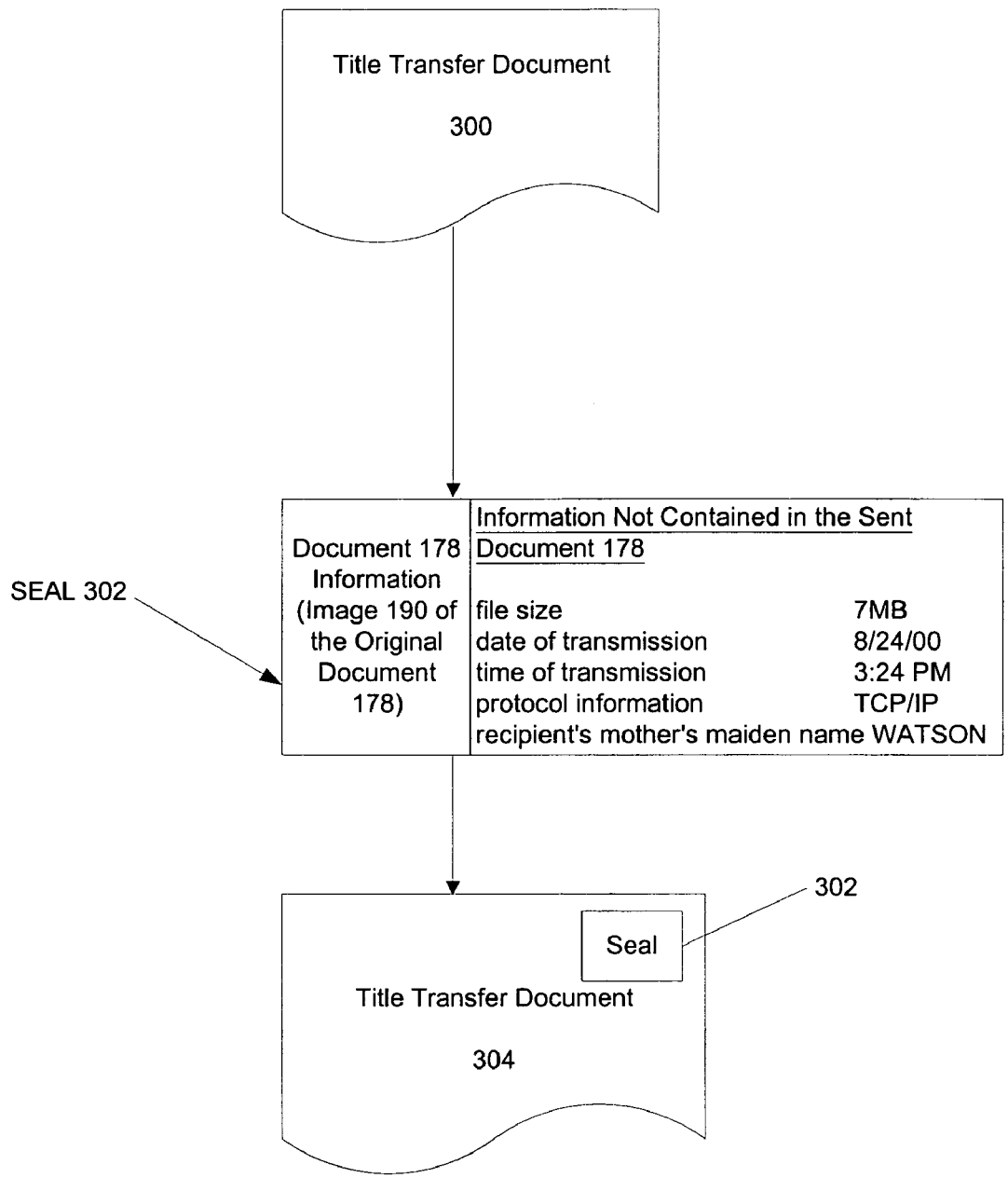
FIG. 3 illustrates a block diagram of a seal 302 attachment system usable in the present invention.

FIG. 3 is a block diagram of a seal 302 attachment system. When the authentication step 208 is included, seal 302 is attached to the document 178 by seal engine 150. The seal 302 is a digital collection of information which may be encoded into a document image 190. In one embodiment of the present invention, the attached seal 302 includes information contained in the sent document 178, such as a portion of image 190 of the sent document 178, as well as information not contained in the sent document 178, which information might include one or more pieces of key information, such as a file size, a date and time of transmission, a protocol identification, such as Transmission Control Protocol/Internet Protocol (TCP/IP), and information known only by a recipient 140, such as the recipient's mother's maiden name.

In the illustrated example, sender 110 wants to send a title transfer document 300 to a recipient 140. As a result of the authentication procedure, seal engine 150 attaches seal 302, encoding a complete representation of the original document 178 as well as information not contained in the sent title transfer document 300. Such information includes the following: a file size of 7 MB, a date of transmission Aug. 24, 2000, a time of transmission 3:24 P.M. Pacific Daylight Savings Time, protocol information TCP/IP, and "Watson" as the recipient's mother's maiden name. The latter information is useful for authentication because only an intended recipient 140 is likely to know this information. The printed title transfer document 304 that is sent to recipient 140 has the attached seal 302. The seal 302 embodiment of the present invention advantageously allows assuring that the received document 178 is an authentic one.

Figure 4:
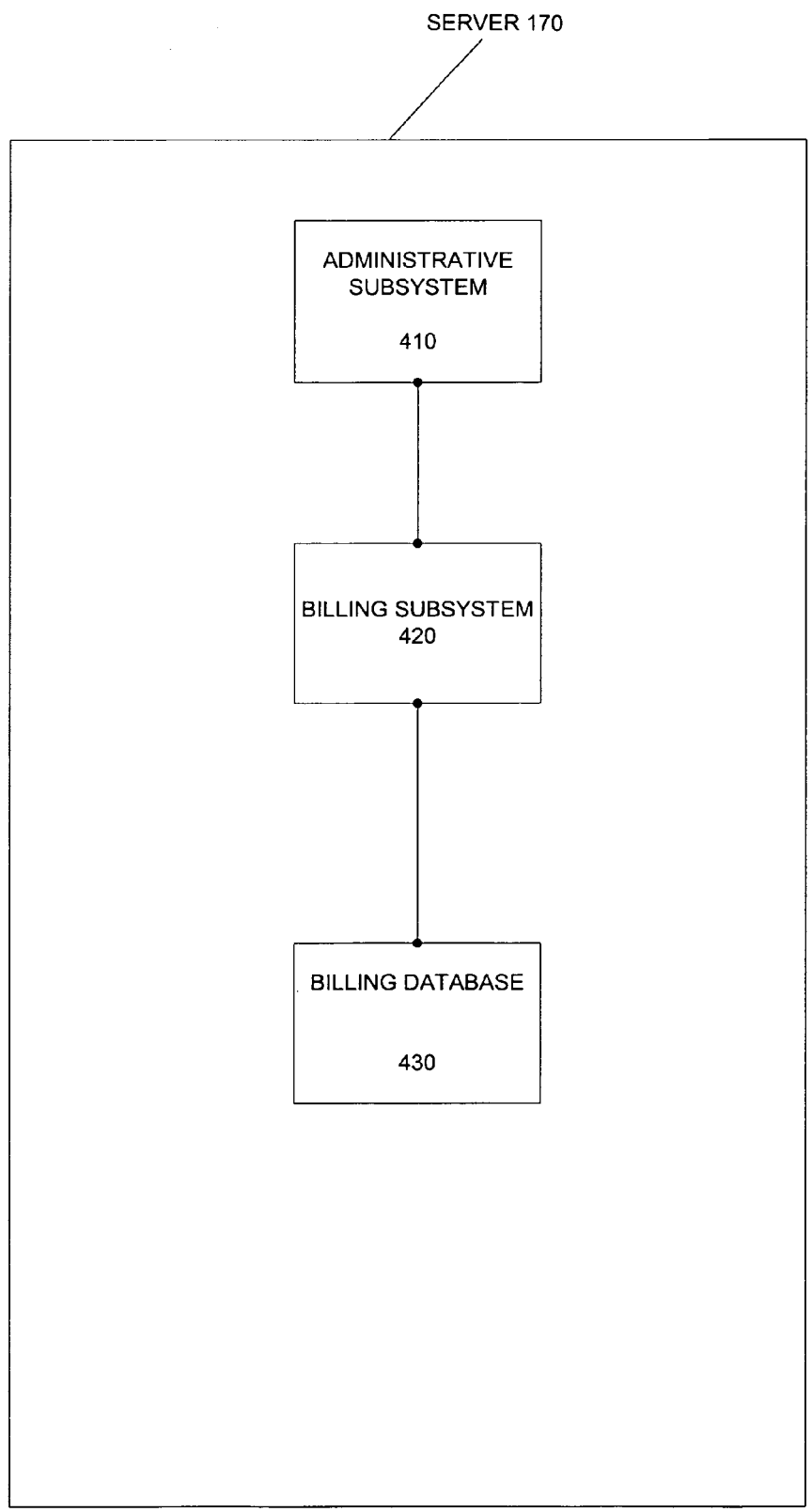
FIG. 4 is a block diagram illustrating an administrative subsystem 410, a billing subsystem 420, and a billing database 430 located on a server 170 of the present invention.

FIG. 4 is a block diagram illustrating an administrative subsystem 410, a billing subsystem 420, and a billing database 430 that are typically located on at least one server 170 (for example, the server 170 co-located with database 175). It should be understood that the architecture shown in FIG. 4 is an example only and is not to be construed in a limiting sense.

A sender 110 may periodically deliver document folders 180 to the same group of recipients 140. As such, it is advantageous for the business to register clients 110, 140 and keep client 110, 140 accounts in one database 430. The administrative subsystem 410 is a system for registering clients 110, 140 and managing system resources based on client 110, 140 requests. The administrative subsystem 410 communicates with billing subsystem 420. The billing subsystem 420 detects monetizing (billing) events generated by the administrative subsystem 410. The billing subsystem 420 can be programmed to charge clients 110, 140 differently for different monetizing events, such as a recipient 140 taking delivery of document folders 180 when the document folders 180 are sent C.O.D. (cash on delivery). A client 110, 140 has an option of specifying a date of expiration of the document folders 180 temporarily stored on network 120. The billing subsystem 420 then charges clients 110, 140 when the document folders 180 are stored beyond the period of time agreed upon by the business and the client 110, 140. The billing subsystem 420, in turn, communicates with billing database 430, which may be part of database 175 or a separate database. Billing database 430 maintains and adjusts client 110, 140 accounts based on information received from billing subsystem 420. Once a monetizing event occurs, that information along with a client 110, 140 name is submitted to billing database 430 to adjust the account of the client 110, 140.

Figure 5:
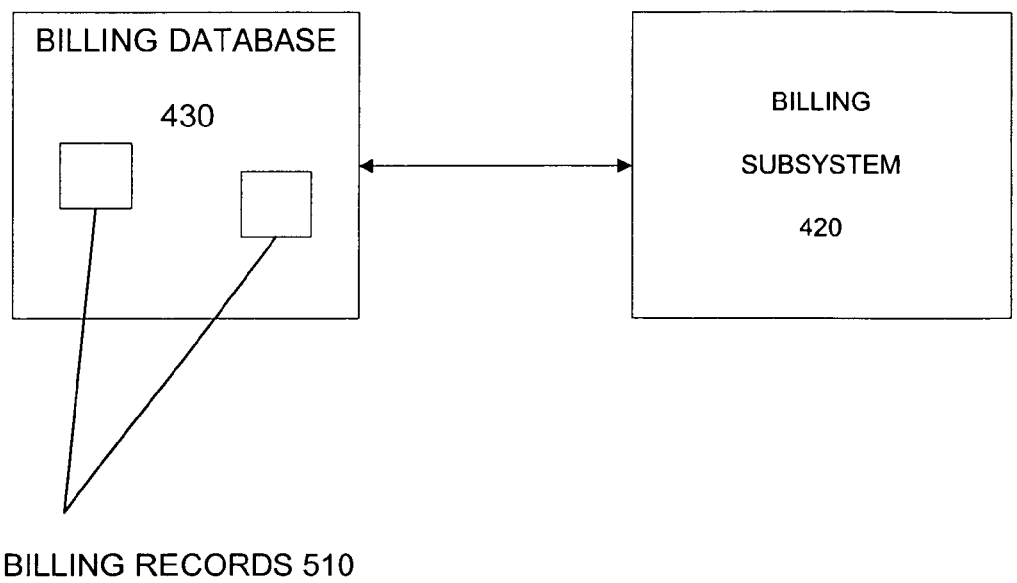
FIG. 5 is a block diagram illustrating billing database 430.

FIG. 5 is a block diagram illustrating billing database 430. Billing database 430 contains billing records 510. Each billing record 510 provides billing information about a particular client 110, 140.

Figure 6:
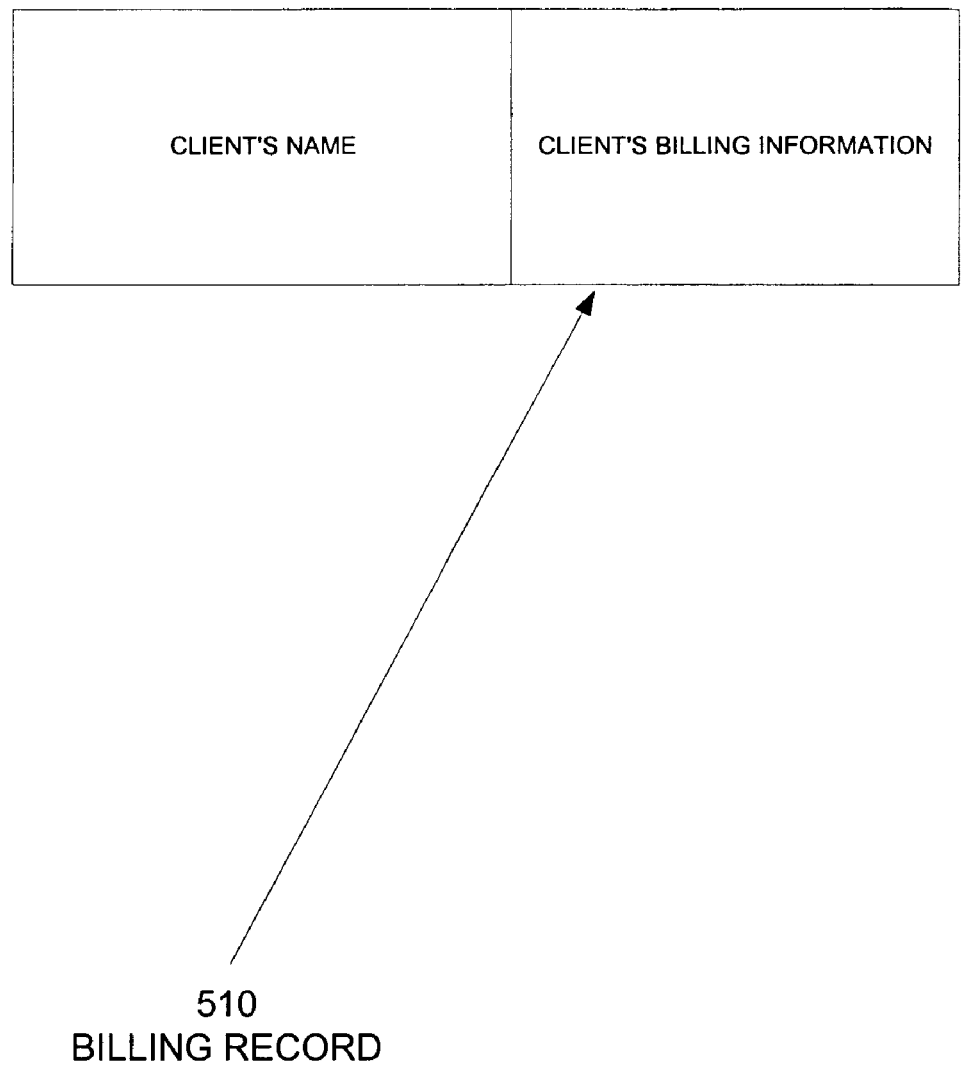
FIG. 6 is a block diagram showing an example of a billing record 510.

FIG. 6 is a block diagram showing an example of a billing record 510, in which billing record 510 has the following two fields: client 110, 140 name and client 110, 140 billing information. The client 110, 140 billing information may include a client 110, 140 account number, the entity to whom the bill is to be sent, and how the client 110, 140 takes responsibility for the payment. When a monetizing event occurs, a memorandum of that event along with the client 110, 140 name is forwarded to the billing database 430, which, in turn adjusts the client 110, 140 account.

Figure 7:
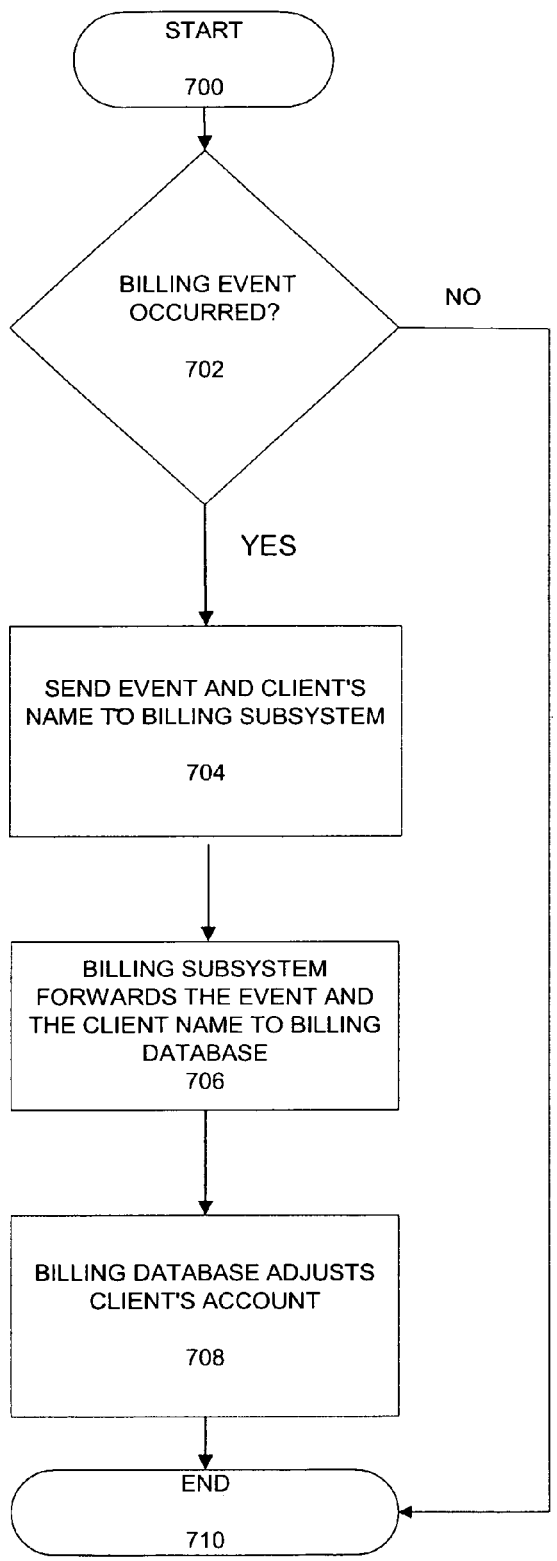
FIG. 7 is a flow chart illustrating an operation of billing subsystem 420.

FIG. 7 is a flow chart showing the operation of billing subsystem 420. The process starts in step 700. In step 702, a periodic query asks whether billing event has taken place. The event could be any monetizing event, such as sending a document folder 180, sending a document folder 180 C.O.D, storing a document folder 180 on destination computer 170 beyond the agreed-upon period of time, or requesting transmitting a document folder 180 with authentication so that a seal 320 is attached. Once a monetizing event occurs in step 702, the administrative subsystem 410 sends information regarding the event including the client's name to the billing subsystem 420, in step 704. The billing subsystem 420 forwards all this information to the billing database 430, in step 706. The billing database 430 adjusts the client's account based on the information received from the billing subsystem 420, in step 708. The process ends in step 710. If the determination in step 702 is negative so that no monetizing event has taken place, the process loops to the end 710 and the client's account is not adjusted.

Figure 8:
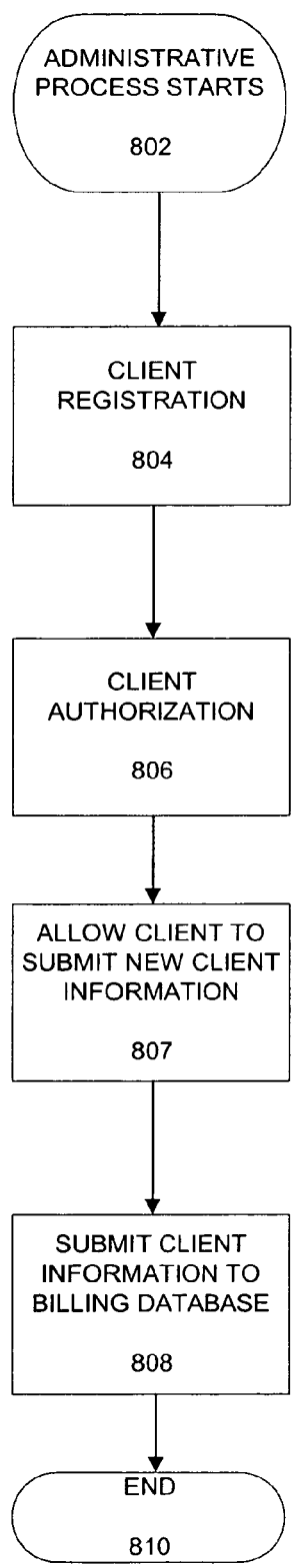
FIG. 8 is a flow chart illustrating an operation of administrative subsystem 410.

FIG. 8 is a flow chart illustrating one operation of administrative subsystem 410. The administrative process includes registering clients 110, 140 and maintaining client 110, 140 resources. In step 802, the process starts. First, a client 110, 140 registers with the business by filling out a registration form in step 804. Filling out the registration form, which may be, for example, a form presented on the World Wide Web, may require providing the client's name, address, and password for authorization purposes. In step 806, an authorization process takes place. Specifically, the business verifies whether a client 110, 140 is who he claims he is. This verification can be accomplished, for example, by sending an e-mail to the client 110, 140 and requesting a response, or by a human being calling the prospective client 110, 140 on the telephone. The process allows the client 110, 140 to submit new client information in step 807, if needed to complete the registration requirements as defined by the business. All the information submitted by the client 110, 140, including the client's name and address, is forwarded in step 808 to the billing database 430. The process ends at step 810.

Figure 9:
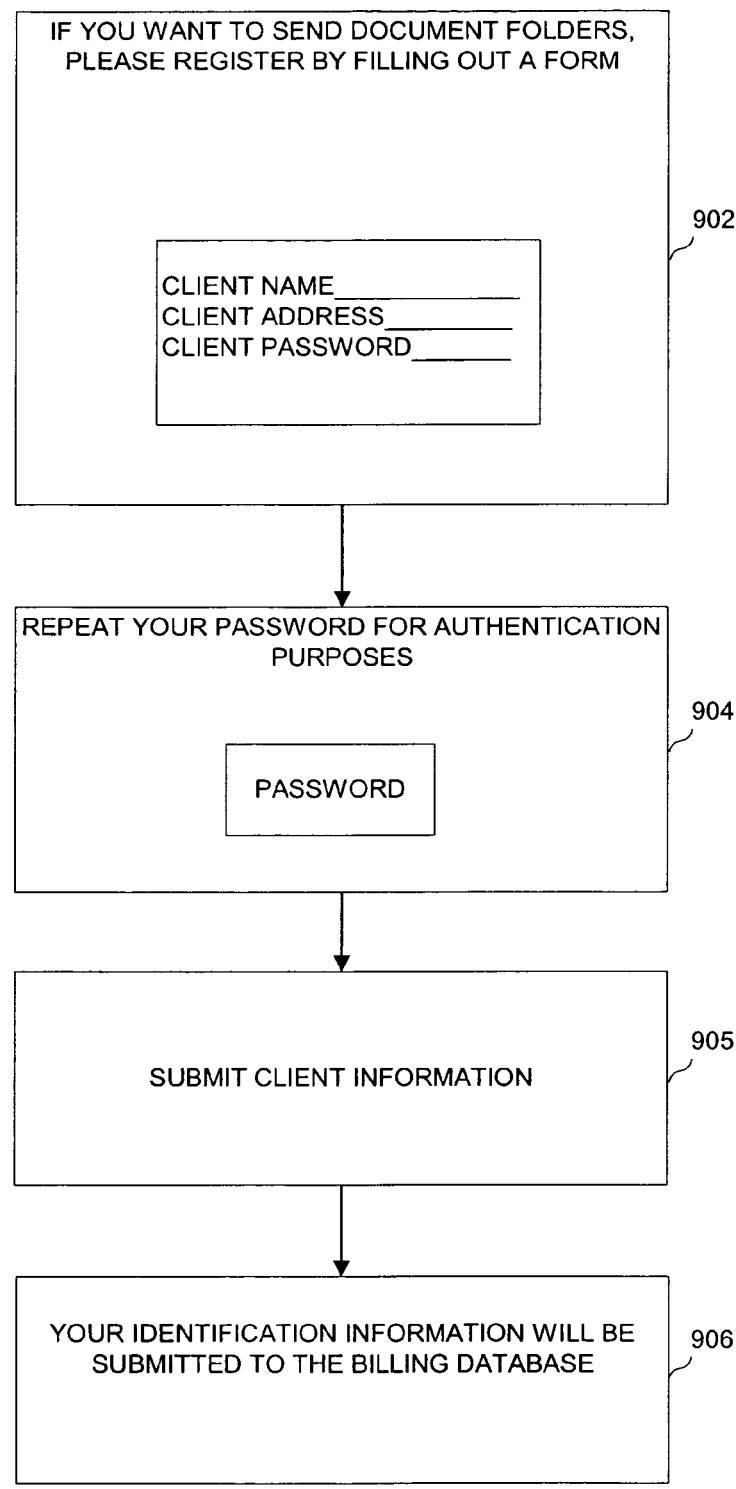
FIG. 9 shows an overview of a client registration process according to a preferred embodiment of the present invention.

FIG. 9 shows an overview of a typical client registration process (step 804 described above). In display 902, the client 110, 140 is asked to register with the business. To do so, the client 110, 140 fills out a form, in this case an online form. The client 110, 140 may be prompted by software contained in the administrative subsystem to enter his name and address, and select a password. Further, in display 904, the client is prompted to re-enter his password for authentication purposes. In other embodiments, a non-password based authorization check might be used. The client's password is an important piece of information, which is used during the client 110, 140 authentication process to ensure that only clients 110, 140 registered with the business can send and receive document folders 180. Once the client 110, 140 provides all identification information, a message in displayed in 905 informing the client 110, 140 to submit his registration information, e.g., by clicking on a "submit" button on his computer screen. In display frame 906, the client 110, 140 is notified that all of his registration information will be submitted to billing database 430.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A method for controlling a server in order to distribute document folders to receiving devices of recipients, wherein the server is a member of a system that includes at least one sending device, a plurality of servers, and at least one receiving device, said method comprising the steps of:

temporarily storing an electronic document folder sent from the sending device, the electronic document folder comprising at least one document;

notifying a recipient of the electronic document folder with an indirect reference, the indirect reference including a code to identify the electronic document folder intended for said recipient;

selecting a destination server from the plurality of servers based on data provided by said recipient when said recipient wishes to retrieve the electronic document folder, the data including address information of the destination server designated by the recipient, wherein the destination server can be accessed from the receiving device of the recipient; and accumulating the temporarily stored electronic document folder at the destination server selected in said selecting step, wherein the receiving device of the recipient can retrieve the accumulated electronic document folder from the destination server via a network based on the code included in the indirect reference, the code being used to identify the electronic document folder intended for said recipient.

2. The method of claim 1, wherein the data provided by the recipient is selected from the group consisting of document reception address data and additional document reception data.

3. The method of claim 2, wherein the document reception address data comprises at least one of path information and a method for network document folder delivery.

4. The method of claim 2, wherein the additional document reception data comprises at least one of receiving device capabilities and document reception location data.

5. The method of claim 1, wherein the indirect reference to the electronic document folder comprises a folder code containing information needed to retrieve the electronic document folder.

6. The method of claim 5, wherein the folder code is a privacy code.

7. The method of claim 5, wherein the folder code is mediacard data, said mediacard data delivered to each recipient prior to said recipient's accessing an electronic document folder.

8. The method of claim 1, further comprising the step of modifying the data for best recipient use with regard to capabilities of a receiving device at said destination server.

9. The method of claim 1, further comprising the step of a server recording an acknowledgment of a delivery of an electronic document folder and making said acknowledgment available to a sender.

10. The method of claim 1, further comprising the step of the recipient retrieving the electronic document folder based upon providing information contained in said indirect reference.

11. The method of claim 1, further comprising the step of authenticating at least some documents within the electronic document folders.

12. The method of claim 11, wherein the authenticating step comprises a seal engine attaching a seal to at least one document within the electronic document folder.

13. The method of claim 12, wherein the attached seal comprises information contained in the at least one document and information not contained in the at least one document.

14. The method of claim 13, wherein the information not contained in the at least one document comprises at least one selected from the group consisting of a date of transmission, a time of transmission, a protocol identification, information known only by an intended recipient, and a file size.

15. The method of claim 1, wherein at least one document within a sent document folder has a printable representation.

16. The method of claim 1, wherein at least one document folder comprises exactly one document.

17. The method of claim 1, wherein the electronic document folders are sent using virtual private network security.

18. The method of claim 1, further comprising the step of charging a recipient upon the recipient's taking delivery of an electronic document folder when the electronic document folder has been sent C.O.D.

19. The method of claim 1, further comprising the step of charging the recipient upon the recipient taking delivery of an electronic document folder when the electronic document folder has been stored on a network beyond an agreed-upon period of time.

20. The method of claim 1, further comprising the step of the recipient specifying a date of expiration of an electronic document folder temporarily stored on a network.

21. The method of claim 1, wherein the step of notifying each recipient comprises sending a notification via email.

22. The method of claim 1, wherein the step of notifying each recipient comprises sending a notification over a cellular phone.

23. The method of claim 1, further comprising the step of converting a sent electronic document folder into a page description language before sending a link to the electronic document folder to a recipient.

24. A system for distributing document folders to recipients, said system comprising:

at least one sending device;

a plurality of servers; and at least one receiving device;

wherein the sending device sends an electronic document folder to one of the plurality of servers, the electronic document folder comprising at least one document; and wherein the at least one server temporarily stores the electronic document folder sent from the sending device, and notifies a recipient of the electronic document folder with an indirect reference including a code that it is used in order to identify the electronic document folder intended for the recipient, and selects a destination server from the plurality of servers based on data provided by the recipient when the recipient wishes to retrieve the electronic document folder, the data including address information of the destination server designated by the recipient and accumulates the electronic document folder in the selected destination server; and wherein the receiving device of the recipient retrieves the accumulated electronic document folder from the selected destination server based on the code included in the indirect reference, the code being used to identify the electronic document folder intended for said recipient.

25. The system of claim 24, further comprising a notification device for notifying the recipient of the sent electronic document folder, by providing an indirect reference to the electronic document folder.

26. The system of claim 24, wherein a network connects said server and destination computer and said network is selected from the group consisting of the Internet, an intranet, a wide-area network, and a local area network.

27. The system of claim 26, further comprising an administrative subsystem coupled to the network for managing system resources based on requests of senders and recipients of electronic document folders.

28. The system of claim 27, further comprising a billing subsystem coupled to the administrative subsystem for detecting monetizing events and charging at least one of a sender and a recipient upon the occurrence of a monetizing event.

29. The system of claim 28, further comprising a billing database coupled to the billing subsystem for maintaining and adjusting accounts of senders and recipients based on information received from the billing subsystem.

30. The system of claim 28, wherein a monetizing event is sending an electronic document folder.

31. The system of claim 28, wherein a monetizing event is sending an electronic document folder C.O.D.

32. The system of claim 28, wherein a monetizing event is temporarily storing an electronic document folder on the network beyond an agreed-upon period of time.

33. The system of claim 28, wherein a monetizing event is a recipient requesting that a sent electronic document folder be authenticated.

34. The system of claim 26, further comprising a seal engine coupled to the network of interconnected computers for attaching a seal to at least one document within an electronic document folder.

35. The system of claim 24, wherein the at least one sending device is selected from the group consisting of a scanner, a facsimile machine, and a computer.

36. The system of claim 24, wherein the receiving device is selected from the group consisting of a Web-enabled personal computer, a Web-enabled printer, a Web-connected digital copier, and a Web-enabled Internet appliance.

37. The system of claim 24, wherein the at least one destination computer is located at a partnership facility having a pre-established business relationship with the system.

38. A computer readable medium containing a computer program product for controlling a server in order to distribute document folders to receiving devices of recipients, wherein the server is a member of a system that includes at least one sending device, a plurality of servers, and at least one receiving device, said computer program product comprising:

program code for temporarily storing an electronic document folder sent from the sending device, the electronic document folder comprising at least one document;

program code for notifying a recipient of the electronic document folder with an indirect reference, the indirect reference including a code to identify the electronic document folder intended for said recipient;

program code for selecting a destination server from the plurality of servers based on data provided by the recipient when the recipient wishes to retrieve the electornic document folder, the data including address information of the destination server designated by the recipient, wherein the destination server can be accessed from the receiving device of the recipient; and program code for accumulating the temporarily stored electronic document folder at the selected destination computer server, wherein the receiving device of the recipient can retrieve the accumulated electronic document folder from the destination server via a network based on the code included in the indirect reference, the code being used to identify the electronic document folder intended for said recipient.

* * * * *

UNITED STATES PATENT AND TRADEMARK OFFICE
CERTIFICATE OF CORRECTION

PATENT NO. : 6,970,847 B1
DATED : November 29, 2005
INVENTOR(S) : Roger D. Melen et al.

It is certified that error appears in the above-identified patent and that said Letters Patent is hereby corrected as shown below:

Column 9,
Line 2, "in" should read -- is --.

Column 12,
Line 31, "electornic" should read -- electronic --.

Signed and Sealed this

Eighteenth Day of April, 2006

JON W. DUDAS
*Director of the United States Patent and Trademark Office*